United States Patent
Baker et al.

[11] Patent Number: 5,891,228
[45] Date of Patent: Apr. 6, 1999

[54] HOT MELT JET INK COMPOSITION

[75] Inventors: Richard J. Baker, Keene; Ann Reitnauer, Dublin, both of N.H.

[73] Assignee: Markem Corporation, Keene, N.H.

[21] Appl. No.: 778,240

[22] Filed: Jan. 8, 1997

[51] Int. Cl.[6] .................................................. C09D 11/12
[52] U.S. Cl. .................................. 106/31.31; 106/31.29; 106/31.3
[58] Field of Search ............................ 106/30 A, 31.29, 106/31.3, 31.31, 31 R

[56] References Cited

U.S. PATENT DOCUMENTS

| | | | |
|---|---|---|---|
| 3,907,694 | 9/1975 | Lu | 252/62.1 |
| 3,968,278 | 7/1976 | Wells | 427/258 |
| 3,985,663 | 10/1976 | Lu et al. | 252/62.1 L |
| 3,990,080 | 11/1976 | Lundgren, Jr. et al. | 252/62.1 L |
| 3,991,226 | 11/1976 | Kosel | 427/17 |
| 4,004,931 | 1/1977 | Lu | 106/30 |
| 4,047,943 | 9/1977 | Lu | 96/1 LY |
| 4,059,444 | 11/1977 | Lu et al. | 96/1 LY |
| 4,116,924 | 9/1978 | Peabody | 260/40 R |
| 4,155,773 | 5/1979 | Ferrill, Jr. | 106/309 |
| 4,292,104 | 9/1981 | Heimbach et al. | 156/235 |
| 4,472,537 | 9/1984 | Johnson et al. | 523/160 |
| 4,497,941 | 2/1985 | Aliani et al. | 526/331 |
| 4,574,057 | 3/1986 | Kaza et al. | 260/101 |
| 4,613,632 | 9/1986 | Aliani et al. | 523/172 |
| 4,623,392 | 11/1986 | Ou-Yang | 106/27 |
| 4,751,025 | 6/1988 | Olechowski et al. | 260/104 |
| 4,824,486 | 4/1989 | Lafler | 106/30 |
| 4,882,417 | 11/1989 | Geuze | 528/392 |
| 4,889,560 | 12/1989 | Jaeger et al. | 106/27 |
| 4,889,761 | 12/1989 | Titterington et al. | 428/195 |
| 4,919,044 | 4/1990 | Lafler | 101/141 |
| 4,939,190 | 7/1990 | Tomioka et al. | 523/206 |
| 4,992,304 | 2/1991 | Titterington | 427/164 |
| 5,084,099 | 1/1992 | Jaeger et al. | 106/22 |
| 5,110,665 | 5/1992 | Titterington | 428/195 |
| 5,182,160 | 1/1993 | Kitamura et al. | 428/195 |
| 5,185,035 | 2/1993 | Brown et al. | 106/31 R |
| 5,188,765 | 2/1993 | Ehrhardt | 252/363.5 |
| 5,259,874 | 11/1993 | Miller et al. | 106/20 R |
| 5,304,587 | 4/1994 | Oswald et al. | 523/161 |
| 5,308,395 | 5/1994 | Burditt et al. | 106/500 |
| 5,372,852 | 12/1994 | Titterington et al. | 427/288 |
| 5,397,387 | 3/1995 | Deng et al. | 106/26 R |
| 5,507,864 | 4/1996 | Jaeger et al. | 106/22 A |
| 5,514,209 | 5/1996 | Larson, Jr. | 106/30 A |

*Primary Examiner*—Deborah Jones
*Attorney, Agent, or Firm*—Baker & Botts LLP

[57] ABSTRACT

A hot melt jet ink composition comprising a glycerol ester of a hydrogenated rosin and Montan wax exhibits good adhesion and resistance to offset and has substantially constant viscosity over a wide range of application temperatures.

40 Claims, 3 Drawing Sheets

HOT MELT JET INK COMPOSITION

This invention relates to hot melt jet ink compositions. More specifically, this invention is directed to hot melt jet ink compositions especially suitable for printing onto substrates at ambient temperature. The hot melt jet inks provide excellent resistance to offset after printing on both porous and nonporous substrates, and provide a permanent image on porous substrates even when subjected to mechanical abrasion.

BACKGROUND OF THE INVENTION

Typically, ink jet printing involves forming characters on a substrate by ejecting ink droplets from a printhead having one or more nozzles. In order to provide a high quality image, hot melt jet ink compositions which are solid at room temperature, but molten at jetting temperatures are used. Unfortunately, such hot melt jet ink compositions, while capable of providing a high quality image, are readily abraded or deformed upon handling of the printed substrate. In particular, this may result from a failure of the ink to penetrate the substrate. Alternately, the adhesion between the surface of the substrate and the applied ink may not be sufficient to overcome cohesive forces in the ink when abraded. One way of promoting ink absorption into a porous substrate is by heating the substrate during printing. In many cases, such as printing on the surface of a package or container, it is not possible to heat the substrate to promote penetration of hot melt ink. Moreover, the print from hot melt jet ink compositions exhibits undesirable offset and pickoff. Such unintentional transfer of the ink from a freshly printed substrate is particularly troublesome when applying hot melt jet ink compositions to porous substrates such as paper and uncoated cardboard, as well as nonporous substrates, for example high density polyethylene containers.

Unintentional ink transfer can be catastrophic when printing bar codes onto substrates. Typically, a bar code reader operates by detecting a difference in the reflection of infrared light between the bar code indicia and a substrate. Print offset and pickoff may lead to absorption of the infrared light by portions of the substrate surface which have no relation to the bar code indicia. In addition, offset and pickoff may reduce the print ink in bar code indicia such that the infrared light absorption of the indicia is reduced. Both these situations can give rise to unreliable, incorrect information upon scanning a substrate with a bar code reader.

SUMMARY OF THE INVENTION

Accordingly, it is an object of the invention to provide hot melt jet inks that overcome the disadvantages of the prior art.

Another object of the invention is to provide an improved ink for hot melt ink jet printers that produces print with a sharp image of high resolution on substrates at ambient temperature which is resistant to abrasion.

An additional object of the invention is to provide hot melt jet ink compositions suitable for printing bar codes onto substrates.

A further object of the invention is to provide an improved ink for hot melt ink jet printers that produces print on substrates at ambient temperature having excellent resistance to offset immediately after printing.

These and other objects of the present invention are attained by providing a hot melt jet ink comprising a glycerol ester of a hydrogenated rosin, a Montan wax and a coloring agent.

A process for making such a hot melt jet ink composition comprises the steps of melting a Montan wax, and adding a glycerol ester of a hydrogenated rosin to the molten wax, wherein the hot melt jet ink composition exhibits a substantially constant viscosity when in a molten state over a range of application temperatures.

The ink compositions of the present invention have the property of improved resistance to offset immediately after printing and provide permanent image retention even when subjected to mechanical abrasion. The compositions are particularly useful for reliably printing bar codes onto substrates.

DESCRIPTION OF THE PREFERRED EMBODIMENTS

Figure 1:
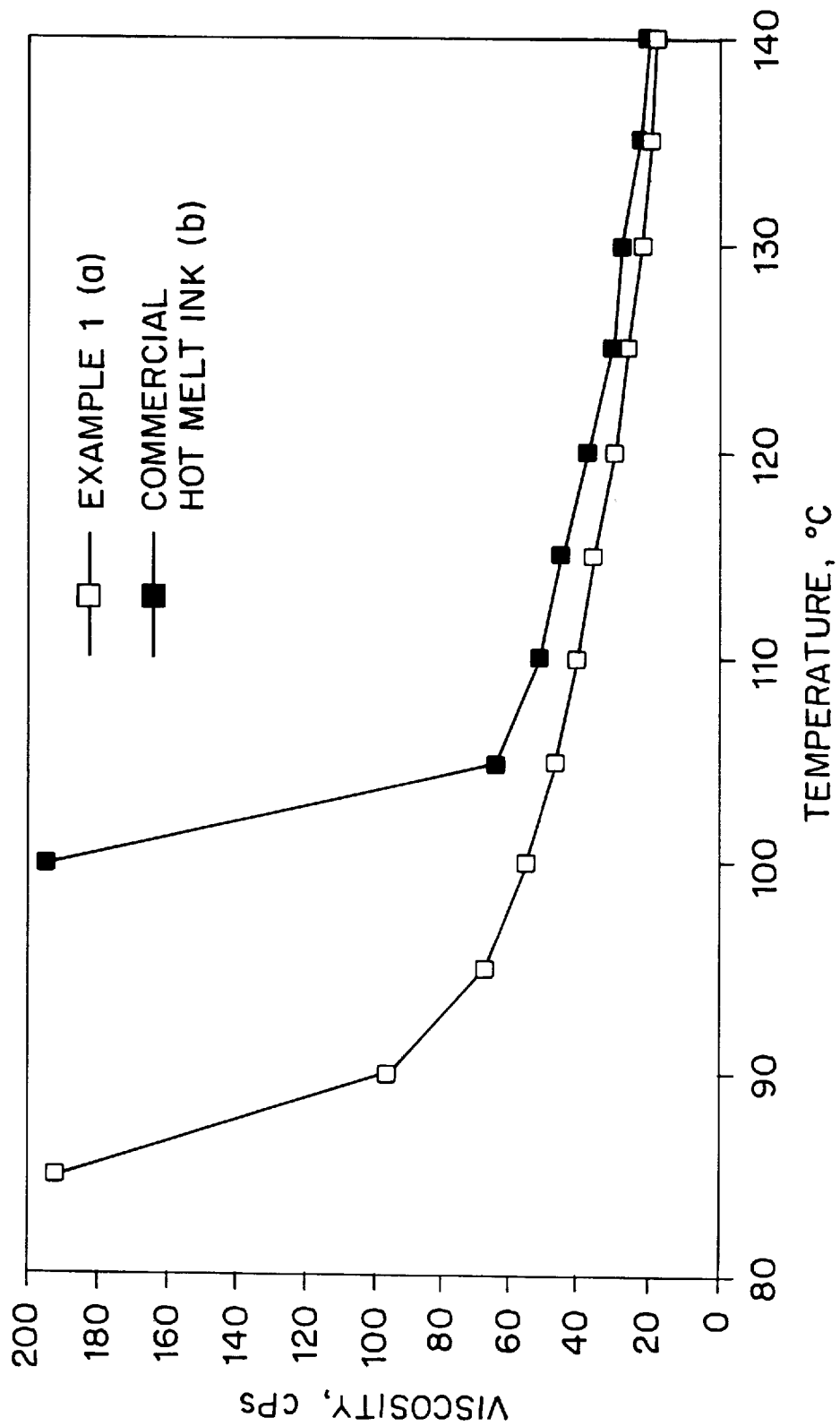
FIG. 1 is a plot of viscosity versus temperature for a hot melt jet ink composition according to the invention and a commercial composition.

Hot melt jet inks according to the invention which are suitable for use in ink jet printers typically have a melt viscosity of at least 10 centipoise, preferably at least 15 centipoise, most preferably in the range from 15 to 25 centipoise, at a temperature of at least 105° C., preferably from 115° C. to 140° C., most preferably at 130° C. to 140° C. The ink compositions of the present invention exhibit a low viscosity which is substantially constant over a wide temperature range when in the molten state, i.e., from about the melting point temperature to the temperature at which the ink is jetted onto the porous substrate. Typically, the hot melt ink according to the present invention is jetted at a temperature of about 135° C. Maximizing the time period the ink composition remains in the molten state during application, or maximizing the "open time", optimizes absorption of the ink by a porous substrate at ambient temperature. In this regard, if mechanical abrasion removes any of the ink adhering to the porous surface, the ink absorbed into the porous substrate remains unaffected and provides a permanent image. Penetration or optimal absorption of the ink into a porous substrate is particularly difficult to achieve without some pre- or post-treatment of the substrate, for example, heating or cold pressing. Surprisingly, the inks of the present invention are readily absorbed into a porous substrate at ambient temperature yet provide a clear, sharp and permanent image. No post-treatment after application is required to get good ink performance.

An essential component of the present invention is a glycerol ester of a hydrogenated rosin. Typically, the resin has a softening point not less than 60° C., preferably less than 100° C., most preferably between 80° C. to 88° C., an acid number less than 10 and a molecular weight of 300 to 10,000. Most preferred is a rosin such as Foral 85 available from Hercules Incorporated. The rosin is present in an amount of 20% to 50% by weight, preferably 24% to 45% by weight, most preferably 30% to 45% by weight of the ink composition.

Preferably, the hot melt jet ink of the present invention includes a Montan wax which is an ester wax prepared from reacting montan acid with mono or difunctional alcohols. More preferably the Montan wax is a Montan wax having a molecular weight greater than 800, an acid value of 15–20 and a drop point of from 75° C. to 90° C., more preferably from 79° C. to 84° C. The Montan wax is a hard wax and typically has a viscosity of approximately 30 centipoise at 100° C. measured at 60 rpm using a Brookfield LVDVII+ viscometer, SC4-18 spindle. A preferred Montan wax is Hoechst Wax E available from Hoechst. The Montan wax is present in an amount 40% to 70% by weight, preferably 40% to 60% by weight, most preferably 50% to 60% by weight of the ink composition.

The ink composition may also include a polyethylene wax which acts as a plasticizer and adds flexibility to the composition. Preferably the polyethylene wax is a branched chain homopolymer polyethylene and is miscible with the Montan wax. More preferably the polyethylene wax has a drop point of 85° C. to 110° C., a density of 0.85 g/cm$^2$ to 0.95 g/cm$^3$, a viscosity of approximately 30 centipoise measured at 140° C. on a Brookfield LVDVII+ viscometer, spindle number SC4-18, 60 rpm, and an average molecular weight of about 900 to 5,000. The polyethylene wax is present in an amount of 0.1% to 10% by weight, preferably 1% to 10% by weight, most preferably 1% to 5% by weight of the ink composition. A preferred polyethylene wax is AC 1702 Polyethylene wax available from Allied Signal in Morristown, N.J.

Because hot melt jet ink compositions prepared in accordance with the invention are in a hot molten state during jetting, antioxidants to inhibit thermally induced oxidation may be added to the ink composition. Suitable antioxidants include those conventionally used in the art, for example primary or chain-breaking antioxidants, typically, sterically hindered phenols such as dibutyl hydroxy toluene compounds and the like, and secondary antioxidants which react with hydroperoxides, as well as combinations thereof. Antioxidant is present in the amount of 0.1% to 5.0% by weight, preferably 0.5% to 3.0% by weight of the ink composition.

Suitable coloring agents, present in amount of at least 0.1% to 9.0% by weight, preferably 0.5% to 3.0% by weight of the ink composition include pigments and dyes. Any dye or pigment may be chosen provided it is capable of being dispersed in the ink composition, is stable for two to four weeks at ink jetting temperatures, and is compatible with the other ink components. Any pigment particles should have a diameter of less than 1 micron. Preferably dyes used in the ink composition absorb light in the infrared range of 700 to 900 nanometers. A preferred dye includes the combination of Sandoplast Green GSB, Polysolve Red 207 and Oracet Yellow GHS for black ink.

Hot melt jet ink compositions of the present invention are generally prepared by melting the wax ingredients, adding the glycerol ester of the hydrogenated rosin, adding the other ink ingredients except for the coloring agent, and stirring until the mixture is homogeneous. The coloring agent is then added to the mixture while stirring until homogeneously dispersed. The molten mixture is then filtered to remove particles larger than 1 micron in size.

Specific embodiments of hot melt jet ink compositions in accordance with the present invention will now be described in detail. These examples are intended to be illustrative, and the invention is not limited to the materials set forth in these embodiments. All parts are by weight of the ink composition unless otherwise indicated.

EXAMPLE 1

| Ingredient | Parts |
| --- | --- |
| Hoechst Wax E | 56.15 |
| A-C 1702 | 3.87 |
| Foral 85 | 36.78 |
| Irganox ® 1010 | 0.70 |
| Irgafos 168 | 0.70 |
| Sandoplast Green GSB | 0.60 |
| Oracet Yellow GHS | 0.75 |
| Polysolve Red 207 | 0.45 |

A hot melt jet ink prepared in accordance with Example 1 resulted in a composition exhibiting excellent adhesion to porous substrates, excellent resistance to offset after printing, and mark permanence after mechanical abrasion such as fingernail scratching. Irganox® 1010 and Irgafos 168 are antioxidants available from Ciba-Geigy in Hawthorn, N.Y.

EXAMPLE 2

The viscosity of the ink composition in Example 1 was measured at temperatures ranging from 60° C. to 135° C. as follows. The ink composition sample (7.85 g) was placed into a Brookfield Thermosel set at 60° C. The temperature was raised in 5° C. intervals and the sample was allowed to equilibrate for 10 minutes at each temperature. After shearing the sample for 10 minutes the viscosity was measured at 60 rpm using a Brookfield LVDVII+ viscometer, SC4-18 spindle. A plot of viscosity versus temperature is shown in FIG. 1 for the ink of Example 1 and a commercial ink based on a tall oil resin.

As can be seen from FIG. 1, the ink composition of the invention exhibited a substantially constant viscosity, or long open time which extends from 140° C. down to about 90° C. in contrast to a lower limit of about 105° C. for the commercial ink. This longer open time allows the ink drop to spread to a greater extent on the substrate prior to freezing. This leads to better adhesion, greater opacity and less of a propensity for abrasion, offset or pickoff owing to a thinner, flatter print. Alternatively, the substrate may be positioned further away from the printhead and maintain an equivalent drop spread to that of the commercial ink.

Surprisingly, the ink composition of the invention is jetted with a faster velocity than the commercial ink, thus providing for a longer and straighter throw distance.

Figure 2A:
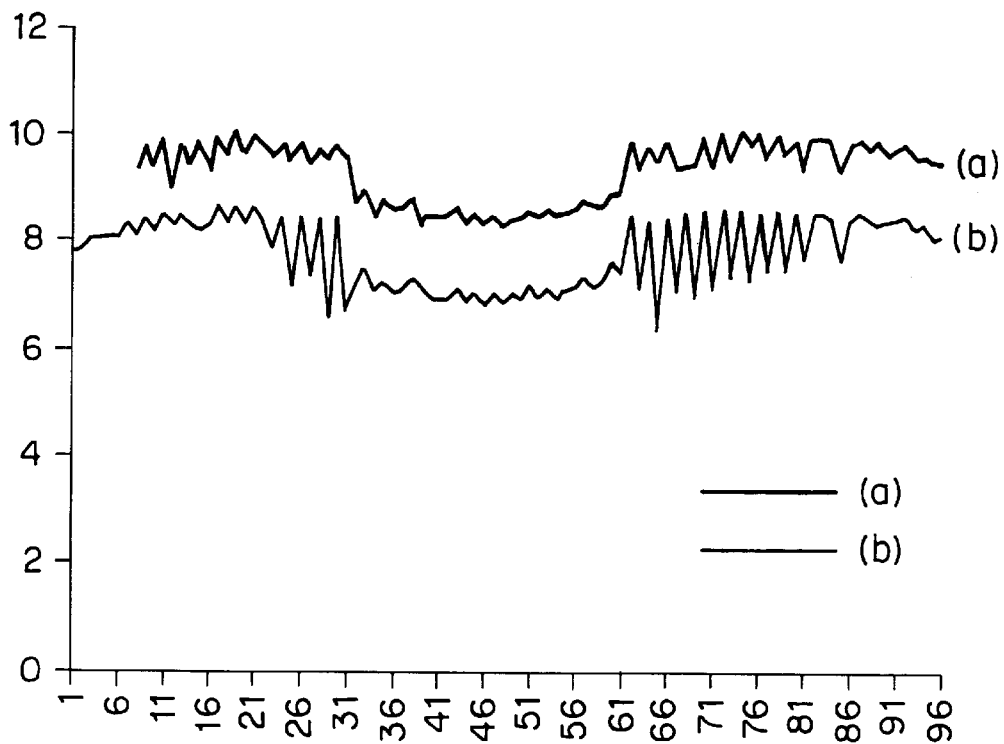
FIGS. 2(a) and 2(b) are plots of jet velocities of droplets of a hot melt jet ink composition according to the invention jetted from an ink jet head.
Figure 2B:
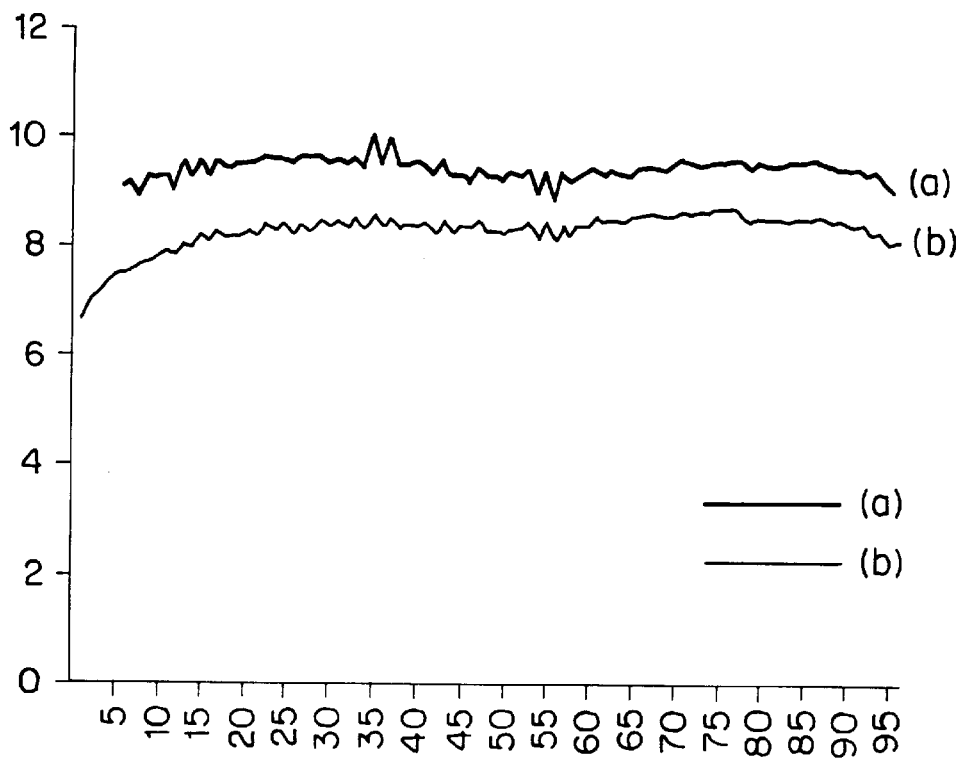

A plot of ejection velocity versus orifice jet for two printheads for an ink prepared in accordance with Example 1(a) and a commercial hot melt ink (b) is shown in FIGS. 2(a) and 2(b). A greater velocity indicates a longer and straighter throw distance. The velocity of the ink ejected from the printhead was measured using a strobe camera focused at a distance of 25 mils away from the jet orifices. The droplet velocities were measured applying both 160 volts and 170 volts to the piezoelectric crystal in the printhead. The results are summarized in Table 1.

TABLE 1

|  | Example 1 | | Commercial Ink | |
| --- | --- | --- | --- | --- |
|  | 160 v | 170 v | 160 v | 170 v |
| Printhead 1 | | | | |
| Mean Velocity (m/sec) | 8.00 | 9.40 | 7.20 | 7.80 |
| Min Velocity (m/Sec) | 7.10 | 8.40 | 6.40 | 6.50 |
| Standard Deviation | 0.49 | 0.55 | 0.50 | 0.66 |
| Average Deviation | 0.42 | 0.48 | 0.44 | 0.61 |
| Volume (picoliters) of droplets | 104.20 | 111.70 | 98.40 | 100.70 |
| Printhead 2 | | | | |
| Mean Velocity (m/sec) | 8.50 | 9.40 | 7.20 | 8.30 |
| Min Velocity (m/sec) | 7.60 | 8.50 | 6.00 | 6.60 |
| Standard Deviation | 0.29 | 0.24 | 0.31 | 0.38 |
| Average Deviation | 0.18 | 0.17 | 0.21 | 0.26 |
| Volume (picoliters) of droplets | 100.70 | 108.30 | 96.60 | 103.00 |

As can be seen from Table 1, ink compositions according to the invention have a mean velocity when ejected upon application of 160 volts which is 11–18% higher than a commercial ink. In addition, ink compositions according to the invention have a mean velocity when ejected upon application of 170 volts which is approximately 20% higher than a commercial ink. This increase in velocity provides for a longer and straighter throw distance which is a significant advantage when printing onto substrates with uneven surfaces. The longer and straighter throw distances allow for positioning an uneven substrate further from the printhead while still obtaining a clear, reproducible image.

Figure 3:
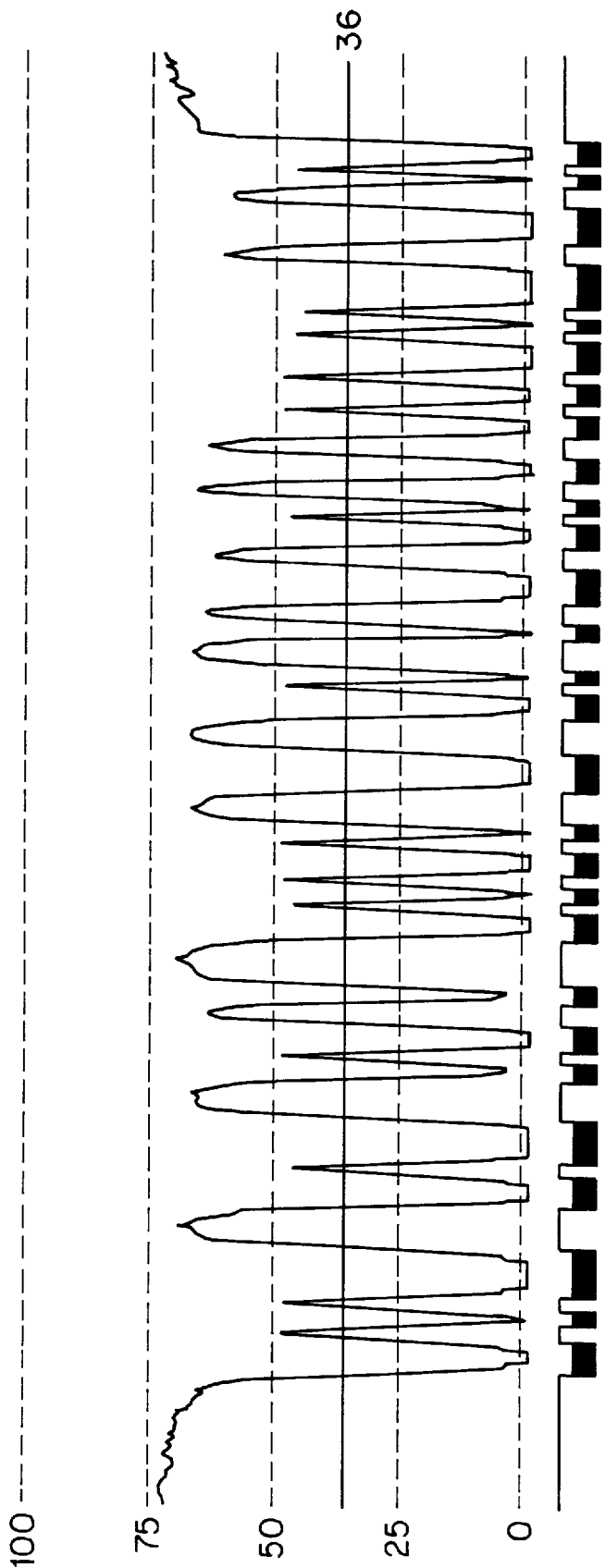
FIG. 3 is a scan profile of bar code indicia printed with a hot melt jet ink composition according to the invention.

This longer throw distance is particularly advantageous when printing bar bodes onto packaging such as cardboard cartons which have uneven surfaces. The scan profile for bar code indicia printed using an ink in accordance with Example 1 is shown in FIG. 3. The infrared absorption of the ink was measured using a Scanalyst Bar Code Analysis system using a PSC 650 wand emitting infrared light of 660 nm and having a 10 mil aperture. As can be seen from FIG. 3, there was essentially no reflectance of the infrared light by the printed bar code indicia.

EXAMPLE 3

The flexibility, adhesion and scratch resistance was determined for several hot melt jet inks having the following composition:

| Ingredient | 1 | 2 | 3 | 4 | 5 | 6 | 7 |
| --- | --- | --- | --- | --- | --- | --- | --- |
| Foral 85 | 38 | 38 | 0 | 38 | 38 | 0 | 0 |
| Hoechst Wax E | 58 | 0 | 58 | 58 | 58 | 58 | 0 |
| A-C 1702 | 0 | 4 | 4 | 4 | 8 | 0 | 4 |

Inks 1–7 were prepared by weighing together the ingredients listed above in the appropriate ratios, melting the mixture, and stirring until a homogeneous mixture was obtained. The room temperature performance of these prepared inks in comparative examples 1–7 was determined as follows. A sample of each ink composition (1.5 grams) was placed into an aluminum dish having a two-inch diameter. The ink was melted and formed a thin film in the aluminum dish. The aluminum dish was stored at room temperature overnight. The aluminum dish was then flexed at room temperature and the ink was assigned a flex rating. A flex rating of 10 indicates the best flexibility, while a flex rating of 1 indicates the worst flexibility, i.e., a brittle ink. Also, the ink was tested for adhesion to the dish at room temperature and assigned an adhesion rating. An adhesion rating of 10 indicates the highest adhesion, while an adhesion rating of 1 indicates the worst adhesion to the dish. Also, the ink was tested by scratching the ink surface with a finger nail at room temperature and assigned a scratch resistance rating. A scratch resistance rating of 10 indicates the best scratch resistance, while a scratch rating of 1 indicates the worst scratch resistance. Surface tack was also noted where evidence of extreme tackiness of the sample was evident. The flex, adhesion and scratch resistance ratings for each ink sample is shown in Table 2.

TABLE 2

| Ink | 1 | 2 | 3 | 4 | 5 | 6 | 7 |
| --- | --- | --- | --- | --- | --- | --- | --- |
| Flexibility | 6 | 4 | 2 | 6 | 10 | 1 | 10 |
| Adhesion | 6 | 9 | 1 | 8 | 10 | 1 | 10 |
| Scratch Resistance | 7 | 10 | 6 | 6 | 3 | — | — |
| Surface Tack | — | tacky | — | — | — | — | very tacky |

As can be seen from Table 2, omission of the refined Montan wax (Wax E) from the hot melt jet ink composition (Example 2) resulted in a hot melt jet ink which exhibits high tack and low flexibility in contrast to a composition containing Wax E (Example 4). Omission of the polyethylene wax (A-C 1702) from the hot melt jet ink composition (Example 1) resulted in a hot melt jet ink which has acceptable flexibility, but exhibits reduced adhesion in contrast to a composition containing polyethylene wax (Example 4). An excess of polyethylene wax (Example 5) resulted in a hot melt jet ink which has excellent flexibility and adhesion, but poorer scratch resistance. Example number 7, consisting only of the polyethylene wax, was very tacky.

Although the invention has been described herein with reference to specific embodiments, many modifications and variations therein will readily occur to those skilled in the art. Accordingly, all such variations and modifications are included within the scope of the invention.

We claim:

1. A hot melt jet ink composition for application to a substrate comprising a glycerol ester of a hydrogenated rosin, Montan wax and a coloring agent, the ink composition having a substantially constant viscosity over a range of application temperatures.

2. A hot melt jet ink composition according to claim 1 further comprising a polyethylene wax.

3. A hot melt jet ink composition according to claim 2, wherein the glycerol ester of a hydrogenated rosin is present in an amount of 20% to 50% by weight of the hot melt jet ink composition.

4. A hot melt jet ink composition according to claim 3, wherein the glycerol ester of the hydrogenated rosin is present in an amount of 24% to 45% by weight of the hot melt jet ink composition.

5. A hot melt jet ink composition according to claim 4, wherein the glycerol ester of the hydrogenated rosin is present in an amount of 30% to 45% by weight of the hot melt jet ink composition.

6. A hot melt jet ink composition according to any one of claims 2, 3, 4 and 5, wherein the Montan wax is present in an amount of 40% to 70% by weight of the hot melt jet ink composition.

7. A hot melt jet ink composition according to claim 6, wherein the Montan wax is present in an amount of 40% to 60% by weight of the hot melt jet ink composition.

8. A hot melt jet ink composition according to claim 7, wherein the Montan wax is present in an amount of 50% to 60% by weight of the hot melt jet ink composition.

9. A hot melt jet ink composition according to any one of claims 2, 3, 4 and 5, wherein the polyethylene wax is present in an amount of 0.1% to 10% by weight of the hot melt jet ink composition.

10. A hot melt jet ink composition according to any one of claims 2, 3, 4 and 5, wherein the polyethylene wax is present in an amount of 1% to 10% by weight of the hot melt jet ink composition.

11. A hot melt jet ink composition according to claims 2, 3, 4 or 5, wherein the polyethylene wax is present in an amount of 1% to 5% by weight of the hot melt jet ink composition.

12. A hot melt jet ink composition according to claim 6, wherein the polyethylene wax is present in an amount of 0.1% to 10% by weight of the hot melt jet ink composition.

13. A hot melt jet ink composition according to claim 6, wherein the polyethylene wax is present in an amount of 1% to 10% by weight of the hot melt jet ink composition.

14. A hot melt jet ink composition according to claim 6, wherein the polyethylene wax is present in an amount of 1% to 5% by weight of the hot melt jet ink composition.

15. A process for making a hot melt jet ink composition comprising the steps of:
   melting a Montan wax to form a molten wax, and
   adding a glycerol ester of a hydrogenated rosin to the molten wax,
   wherein the glycerol ester of a hydrogenated rosin and Montan wax are present in an amount such that the hot melt jet ink composition exhibits a substantially constant viscosity over a range of application temperatures when in a molten state.

16. A process according to claim 15 further comprising melting a polyethylene wax together with the Montan wax.

17. A process according to claim 15, wherein the glycerol ester of a hydrogenated rosin is present in an amount of 20% to 50% by weight of the hot melt jet ink composition.

18. A process according to claim 17, wherein the glycerol ester of a hydrogenated rosin is present in an amount of 24to 45% by weight of the hot melt jet ink composition.

19. A process according to claim 18, wherein the glycerol ester of a hydrogenated rosin is present in an amount of 30% to 45% by weight of the hot melt jet ink composition.

20. A process according to any one of claims 16, 17, 18 and 19, wherein the Montan wax is present in an amount of 40% to 70% by weight of the hot melt jet ink composition.

21. A process according to claim 20, wherein the Montan wax is present in an amount of 40% to 60% by weight of the hot melt jet ink composition.

22. A process according to claim 21, wherein the Montan wax is present in an amount of 50% to 60% by weight of the hot melt jet ink composition.

23. A process according to any one of claims 16, 17, 18 and 19, wherein the polyethylene wax is present in an amount of 0.1% to 10% by weight of the hot melt jet ink composition.

24. A process according to any one of claims 16, 17, 18 and 19, wherein the polyethylene wax is present in an amount of 1% to 10% by weight of the hot melt jet ink composition.

25. A process according to any one of claims 16, 17, 18 and 19, wherein the polyethylene wax is present in an amount of 1% to 5% by weight of the hot melt jet ink composition.

26. A process according to claim 20, wherein the polyethylene wax is present in an amount of 0.1% to 10% by weight of the hot melt jet ink composition.

27. A process according to claim 20, wherein the polyethylene wax is present in an amount of 1% to 10% by weight of the hot melt jet ink composition.

28. A process according to claim 20, wherein the polyethylene wax is present in an amount of 1% to 5% by weight of the hot melt jet ink composition.

29. A method of applying the bar code indicia to a substrate comprising the steps of:
   providing a hot melt jet ink composition comprising a glycerol ester of a hydrogenated rosin and a Montan wax, and
   jetting the hot melt jet ink composition onto a substrate to form bar code indicia.

30. A method according to claim 29, wherein the hot melt jet ink composition further comprises a polyethylene wax.

31. A method according to claim 29, wherein the glycerol ester of a hydrogenated rosin is present in an amount of 20% to 50% by weight of the hot melt jet ink composition, and the Montan wax is present in an amount of 40% to 60% by weight of the hot melt jet ink composition.

32. A method according to claim 30, wherein the glycerol ester of a hydrogenated rosin is present in an amount of 20% to 50% by weight of the hot melt jet ink composition, the Montan wax is present in an amount of 40% to 60% by weight of the hot melt jet ink composition, and the polyethylene wax is present in an amount of 1% to 10% by weight of the hot melt jet ink composition.

33. A method according to claim 29, wherein the glycerol ester of a hydrogenated rosin is present in an amount of 30% to 45% by weight of the hot melt jet ink composition, and the Montan wax is present in an amount of 50% to 60% by weight of the hot melt jet ink composition.

34. A method according to claim 30, wherein the glycerol ester of a hydrogenated rosin is present in an amount of 30% to 45% by weight of the hot melt jet ink composition, the Montan wax is present in an amount of 50% to 60% by weight of the hot melt jet ink composition, and the polyethylene wax is present in an amount of 1% to 5% by weight of the hot melt jet ink composition.

35. A hot melt jet ink composition according to claim 1, wherein the Montan wax is present in an amount of 40% to 70% by weight of the hot melt jet ink composition.

36. A hot melt jet ink composition according to claim 35, wherein the Montan wax is present in an amount of 40% to 60% by weight of the hot melt jet ink composition.

37. A hot melt jet ink composition according to claim 36, wherein the Montan wax is present in an amount of 50% to 60% by weight of the hot melt jet ink composition.

38. A process according to claim 15, wherein the Montan wax is present in an amount of 40% to 70% by weight of the hot melt jet ink composition.

39. A process according to claim 15, wherein the Montan wax is present in an amount of 40% to 60% by weight of the hot melt jet ink composition.

40. A process according to claim 15, wherein the Montan wax is present in an amount of 50% to 60% by weight of the hot melt jet ink composition.

* * * * *